United States Patent
Gupta et al.

(10) Patent No.: US 10,078,630 B1
(45) Date of Patent: *Sep. 18, 2018

(54) MULTILINGUAL CONTENT MANAGEMENT

(71) Applicant: INTERNATIONAL BUSINESS MACHINES CORPORATION, Armonk, NY (US)

(72) Inventors: Deepak Gupta, Indirapuram (IN); Namita Gupta, Shalimar Bagh (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,224

(22) Filed: Sep. 11, 2017

Related U.S. Application Data

(63) Continuation of application No. 15/590,103, filed on May 9, 2017.

(51) Int. Cl.
  *G06F 17/20* (2006.01)
  *G06F 17/27* (2006.01)
  (Continued)

(52) U.S. Cl.
  CPC .......... *G06F 17/275* (2013.01); *G06F 9/4448* (2013.01); *G06F 9/454* (2018.02);
  (Continued)

(58) Field of Classification Search
  CPC .. G06F 17/289; G06F 17/2872; G06F 17/275; G06F 17/28; G06F 17/3089; G06F 17/21; G06F 17/2258; G06F 17/2264; G06F 17/2288; G06F 17/248; G06F 17/2755; G06F 17/2836; G06F 17/2845; G06F 17/2863; G06F 17/2881; G06F 17/30011; G06F 9/3851; G06F 9/3005; G06F 3/0237; G06F 11/362; G06F 15/00; G06F 9/4448;
  (Continued)

(56) References Cited

U.S. PATENT DOCUMENTS

| | | | | |
|---|---|---|---|---|
| 5,333,180 | A | * | 7/1994 | Brown .............. H04M 3/53316 379/79 |
| 5,440,615 | A | * | 8/1995 | Caccuro ................ H04M 3/533 379/207.01 |

(Continued)

OTHER PUBLICATIONS

IBM: List of IBM Patents or Patent Applications Treated As Related (Appendix P), Oct. 23, 2017, 2 pages.

(Continued)

*Primary Examiner* — Vijay B Chawan
(74) *Attorney, Agent, or Firm* — L. Jeffrey Kelly

(57) ABSTRACT

Disclosed aspects relate to multilingual content management. A set of language usage data for a set of languages may be ingested from a set of mobile computing devices by a multilingual content management engine. A language profile for a group of users that indicates relative usage of the set of languages with respect to the group of users by may determined by the multilingual content management engine using the set of language usage data for the set of languages. A multilingual message may be generated based on the language profile for the group of users by the multilingual content management engine. The multilingual message may be provided to the group of users by the multilingual content management engine.

1 Claim, 7 Drawing Sheets

US 10,078,630 B1

Page 2

(51) Int. Cl.
*G06Q 50/00* (2012.01)
*G06F 9/44* (2018.01)
*G06F 17/30* (2006.01)
*G06F 17/28* (2006.01)
*H04L 29/08* (2006.01)
*G06F 9/451* (2018.01)
*H04L 12/58* (2006.01)

(52) U.S. Cl.
CPC ........ *G06F 17/289* (2013.01); *G06F 17/3089* (2013.01); *G06Q 50/01* (2013.01); *H04L 67/22* (2013.01); *H04L 51/04* (2013.01); *H04L 67/306* (2013.01)

(58) Field of Classification Search
CPC ....... G10L 15/26; G10L 13/00; G10L 13/033; G10L 15/005; G10L 15/18; G10L 15/20; G10L 15/22; G10L 15/265; H04M 2203/2061; H04M 2201/40; H04M 2201/60; H04M 2203/4509; H04M 3/5335; H04M 3/53316; H04M 3/53383
USPC ........................ 704/8–10, 258, 274, 201, 270
See application file for complete search history.

(56) References Cited

U.S. PATENT DOCUMENTS

| | | | | |
|---|---|---|---|---|
| 5,940,790 | A * | 8/1999 | Vesterinen | G06F 17/2836 379/243 |
| 6,526,426 | B1 * | 2/2003 | Lakritz | G06F 17/2258 704/8 |
| 7,272,377 | B2 | 9/2007 | Cox et al. | |
| 7,809,117 | B2 * | 10/2010 | Runge | H04M 3/5307 379/100.08 |
| 8,185,374 | B2 * | 5/2012 | Kong | G06F 17/289 704/2 |
| 8,265,938 | B1 * | 9/2012 | Verna | G06F 17/2881 379/37 |
| 8,380,507 | B2 * | 2/2013 | Herman | G10L 13/033 704/260 |
| 8,928,591 | B2 * | 1/2015 | Swartz | G06F 3/0237 345/168 |
| 9,093,062 | B2 | 7/2015 | Daye et al. | |
| 9,519,642 | B2 * | 12/2016 | Johnson, III | G06F 17/289 |
| 2002/0105959 | A1 * | 8/2002 | Laurin | H04H 20/22 370/432 |
| 2002/0111146 | A1 * | 8/2002 | Fridman | B60Q 1/2611 455/99 |
| 2003/0154071 | A1 * | 8/2003 | Shreve | G06F 17/2845 704/9 |
| 2004/0243392 | A1 * | 12/2004 | Chino | G06F 17/27 704/7 |
| 2006/0227945 | A1 * | 10/2006 | Runge | H04M 3/5307 379/88.05 |
| 2008/0071518 | A1 * | 3/2008 | Narayanan | G06F 17/278 704/2 |
| 2008/0115113 | A1 * | 5/2008 | Codrescu | G06F 9/3005 717/127 |
| 2008/0300880 | A1 * | 12/2008 | Gelbman | G06F 17/289 704/256 |
| 2010/0010940 | A1 * | 1/2010 | Spyropoulos | G06F 17/30684 706/12 |
| 2010/0299142 | A1 * | 11/2010 | Freeman | G06Q 30/0241 704/9 |
| 2010/0324909 | A1 * | 12/2010 | Runge | H04M 3/5307 704/270 |
| 2011/0219136 | A1 | 9/2011 | DeLuca et al. | |
| 2012/0004899 | A1 * | 1/2012 | Arshi | G06Q 30/02 704/8 |
| 2012/0216115 | A1 * | 8/2012 | Lorenceau | G06Q 10/10 715/704 |
| 2013/0124598 | A1 * | 5/2013 | Lakritz | G06F 17/289 709/201 |
| 2013/0124987 | A1 * | 5/2013 | Lakritz | G06F 17/289 715/264 |
| 2014/0244236 | A1 * | 8/2014 | Johnson, III | G06F 17/289 704/2 |
| 2014/0335483 | A1 * | 11/2014 | Buryak | G09B 5/08 434/167 |
| 2014/0337425 | A1 * | 11/2014 | Buryak | H04L 67/22 709/204 |
| 2015/0007221 | A1 | 1/2015 | Bhogal et al. | |
| 2015/0142431 | A1 | 5/2015 | Daye et al. | |
| 2015/0235540 | A1 * | 8/2015 | Verna | G08B 21/02 340/539.11 |
| 2015/0309984 | A1 | 10/2015 | Bradford et al. | |
| 2016/0110346 | A1 | 4/2016 | Lieske et al. | |
| 2017/0068663 | A1 * | 3/2017 | Johnson, III | G06F 17/289 |
| 2017/0180067 | A1 | 6/2017 | Poornachandran et al. | |

OTHER PUBLICATIONS

U.S. Appl. No. 15/700,224, filed Sep. 11, 2017.
U.S. Appl. No. 15/590,103, filed May 9, 2017.
Pending U.S. Appl. No. 15/590,103, filed May 9, 2017, entitled: "Multilingual Content Management", 66 pages.

* cited by examiner

MULTILINGUAL CONTENT MANAGEMENT

BACKGROUND

This disclosure relates generally to computer systems and, more particularly, relates to multilingual content management. The amount of data that needs to be managed is increasing. Management of data may be desired to be performed as efficiently as possible. As data needing to be managed increases, the need for multilingual content management may also increase.

Speech recognition systems have become embedded in many technological fields, example, smart phones, personal computers, and automobile navigation systems are capable of recognizing and responding to voice commands. With advances in long-distance travel and communications, the degree to which diverse languages are intersecting is growing rapidly; and at various places, we find people speaking diverse languages. It may be advantageous to disseminate information to people that speak different languages as quickly and efficiently as possible, for example, via public announcements.

SUMMARY

Embodiments of the present invention disclose a method, computer program product, and system for multilingual content management. A set of language usage data for a set of languages is ingested from a set of mobile computing devices by a multilingual content management engine. A language profile for a group of users that indicates relative usage of the set of languages with respect to the group of users is determined by the multilingual content management engine using the set of language usage data for the set of languages. A multilingual message is generated based on the language profile for the group of users by the multilingual content management engine. The multilingual message is provided to the group of users by the multilingual content management engine.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
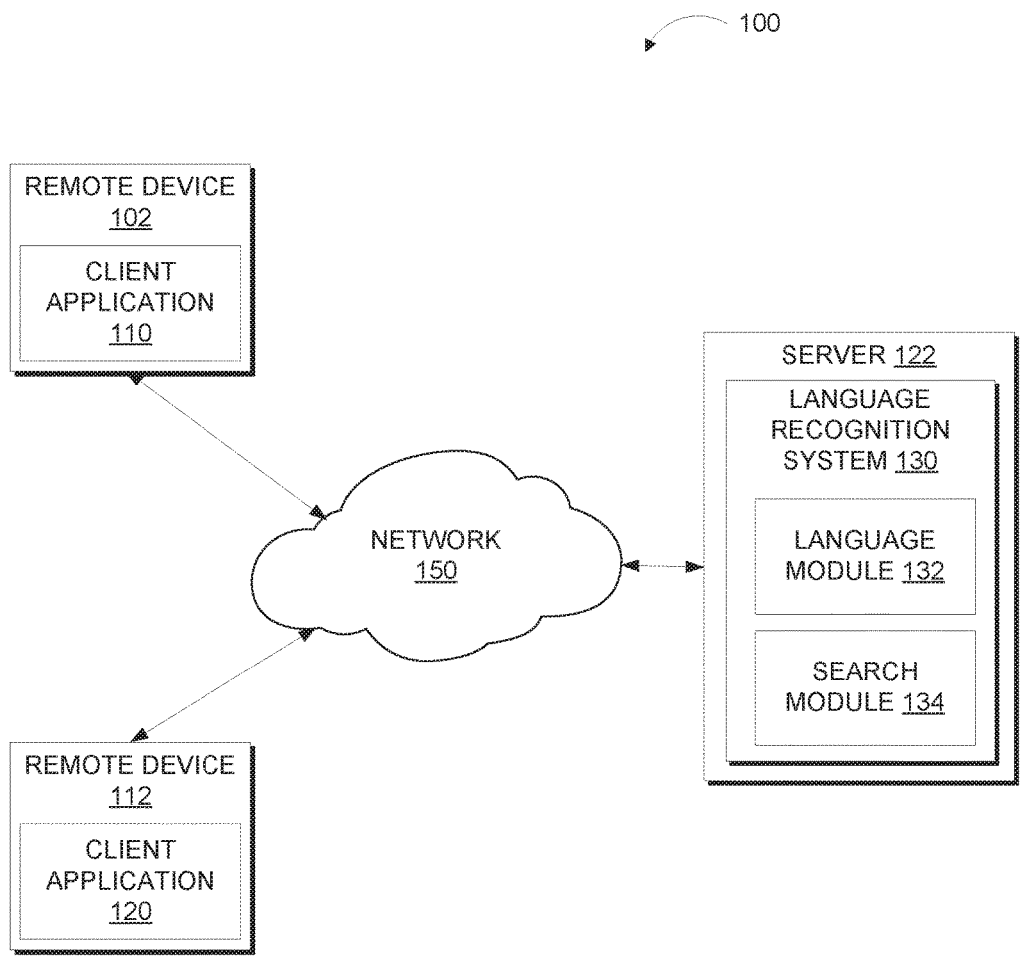
FIG. 1 illustrates a computing environment, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to multilingual content management. Mobile computing devices (e.g., smart phones, smart watches) may monitor language usage data for users (e.g., social network activity, reading, verbal communication, media consumption) to identify one or more languages known to the user. A multilingual content management engine (e.g., at a public location such as an airport, train station, stadium, restaurant) may collect the language usage data from users' mobile computing devices to determine a language profile for a group of users. The language profile may indicate the relative usage of one or more languages by the users in the group (e.g., proportion of users in the group that know a particular language). For instance, the language profile may rank a plurality of languages based on their level of usage with respect to the group of users. Based on the language profile for the group of users, the multilingual content management engine may generate a multilingual message (e.g., announcement, notice, advertisement) for provision to the group of users. Leveraging a language profile for a group of users with respect to data communication may be associated with benefits such as communication effectiveness, public announcement flexibility, and information exchange efficiency.

Public announcements provided in multiple languages are one tool used to communicate to groups of people with diverse language backgrounds. Aspects of the disclosure relate to the recognition that, in some situations, public announcements may be made without taking into account the languages used and spoken by the group of users to whom the announcement is made, limiting the usefulness and reliability of the communication. Accordingly, aspects of the disclosure relate to collecting language usage data for a group of users (e.g., from mobile computing devices of the users) to determine a language profile that indicates the relative usage of a number of languages by the users of the group, and generating multilingual announcements for the group of users in accordance with the language profile. As such, the language profile for the group of users may be used to facilitate meaningful and efficient communication with respect to groups of people with diverse language backgrounds.

Aspects of the disclosure relate to multilingual content management. Mobile computing devices may monitor language usage data for of users to identify one or more languages known to the user. A multilingual content management engine may collect the language usage data from users' mobile computing devices to determine a language profile for a group of users. The language profile may indicate the relative usage of one or more languages by the users in the group. For instance, the language profile may rank a plurality of languages based on their level of usage with respect to the group of users. Based on the language profile for the group of users, the multilingual content management engine may generate a multilingual message for provision to the group of users.

Aspects of the disclosure relate to a system, method, and computer program product for multilingual content management. A set of language usage data for a set of languages may be ingested from a set of mobile computing devices by a multilingual content management engine. A language profile for a group of users that indicates relative usage of the set of languages with respect to the group of users by may determine by the multilingual content management engine using the set of language usage data for the set of languages. A multilingual message may be generated based on the language profile for the group of users by the multilingual content management engine. The multilingual message may be provided to the group of users by the multilingual content management engine.

In embodiments, it may be resolved that the set of languages includes a first subset of the set of languages and a second subset of the set of languages. A first proportional utilization value that indicates relative usage of the first subset of languages may be computed for the first subset of the set of languages and a second proportional utilization value that indicates relative usage of the second subset of languages may be computed for the second subset of the set of languages. It may be ascertained that the first proportional utilization value for the first subset of the set of languages exceeds the second proportional utilization value for the second subset of the set of languages, and the multilingual message may be established using the first subset of the set of languages. In embodiments, a first subset of language usage data may be collected for a first subset of users of the group of users, and a first list of languages associated with the first subset of users may be identified. In embodiments, a second subset of language usage data may be collected for a second subset of users of the group of users, a second list of languages associated with the second subset of users may be identified, and the first list of languages and the second list of languages may be compiled by the multilingual content management engine to ingest the set of language usage data for the set of languages.

In embodiments, a first ranking may be assigned to a first language of the set of languages based on analyzing the set of language usage data for the set of languages. A second ranking may be assigned to a second language of the set of languages based on analyzing the set of language usage data for the set of languages. A rank-order to indicate a usage-based hierarchy for the set of languages may be established by the multilingual content management engine based on the first ranking for the first language of the set of languages and the second ranking for the second language of the set of languages. In embodiments, a first language message using the first language and a second language message using the second language may be generated by the multilingual content management engine based on the rank-order. The first language message may be transmitted to the group of users with respect to a first temporal period, and the second language message may be transmitted to the group of users with respect to a second temporal period. In embodiments, a set of language usage elements including a social networking activity element, a textual content element, a communication activity element, a media content element, and a sensor-derived data element may be monitored to collect the set of language usage data for the set of languages. Altogether, performance or efficiency benefits with respect to multilingual content management may occur. Aspects may save resources such as bandwidth, processing, or memory.

Turning now to the figures, FIG. 1 is a diagrammatic illustration of an exemplary computing environment, consistent with embodiments of the present disclosure. In certain embodiments, the environment 100 can include one or more remote devices 102, 112, and one or more servers 122. Remote devices 102, 112, and server 122 may be communicate over a network 150 in which server 122 comprises a central hub from which remote devices 102, 112 can establish a communication connection. Alternatively, remote devices 102, 112, and server 122 may be configured in any other suitable relationship (e.g., in a peer-to-peer or other relationships).

In certain embodiments, the network 150 can be implemented by any number of any suitable communications media (e.g., wide area network (WAN), local area network (LAN), Internet, Intranet, etc.). Alternatively, remote devices 102, 112 and server 122 may be local to each other, and communicate via any appropriate local communication medium (e.g., local area network (LAN), hardwire, wireless link, Intranet, etc.). In certain embodiments, the network 150 can be implemented within a cloud computing environment, or using one or more cloud computing services. Consistent with various embodiments, a cloud-computing environment can include a network-based, distributed data processing system that provides one or more cloud computing services. In certain embodiments, a cloud-computing environment can include many computers, hundreds or thousands of them, disposed within one or more data centers and configured to share resources over the network.

In certain embodiments, server 122 can include a language recognition system 130 having a search module 134 and a language module 132. In certain embodiments, the search application may be implemented by a conventional or other search engine, and may be distributed across multiple computer systems. The search module 134 can be configured to search one or more databases or other computer systems for content that is related to input received from a user, for example via remote devices 102 and/or 112.

In various embodiments sever 122 receives input from remote devices 102 and/or 112 and communicate the received data to server 122. For example, the remote devices 102, 112 may include a client application 110 and 120 respectively (e.g., in the form of a web browser or any other suitable software module) and present a graphical user (e.g., GUI, etc.) or other interface (e.g., command line prompts, menu screens, etc.) to solicit audio data from users for submission to one or more servers 122 and further to display data resulting from an analysis performed by search module 134 and answer module 132 via language recognition system 130. For example, client application 110 and 120, running in the foreground as an active application or as a background application, may receive a recording, in the form of audio data, of a user's voice, via remote device 102 and 112. Remote device 102 and 112 may communicate the audio data to server 112 via network 105. The audio data may be analyzed, as described in further detail in FIG. 2, and results communicated to remote devices 103 and 112.

In various embodiments of the present invention, Remote devices 102, 112, and server 122 may each respectively be a laptop computer, tablet computer, netbook computer, personal computer (PC), a desktop computer, a smart phone, or any programmable electronic device capable of receiving input and performing various communication via network 150. Remote devices 102, 112, and server 122 may include internal and external hardware components, as depicted and described in further detail with respect to FIG. 7.

It should be appreciated that the language module 132, search module 134, and client applications 110 and 120 may include one or more modules or units to perform the various functions of present disclosure embodiments described below), and may be implemented by any combination of any quantity of software and/or hardware modules or units. In certain embodiments, remote devices 102, 112 enable users to submit questions (e.g., search requests or other queries) to host devices 122 to retrieve search results.

Figure 2:
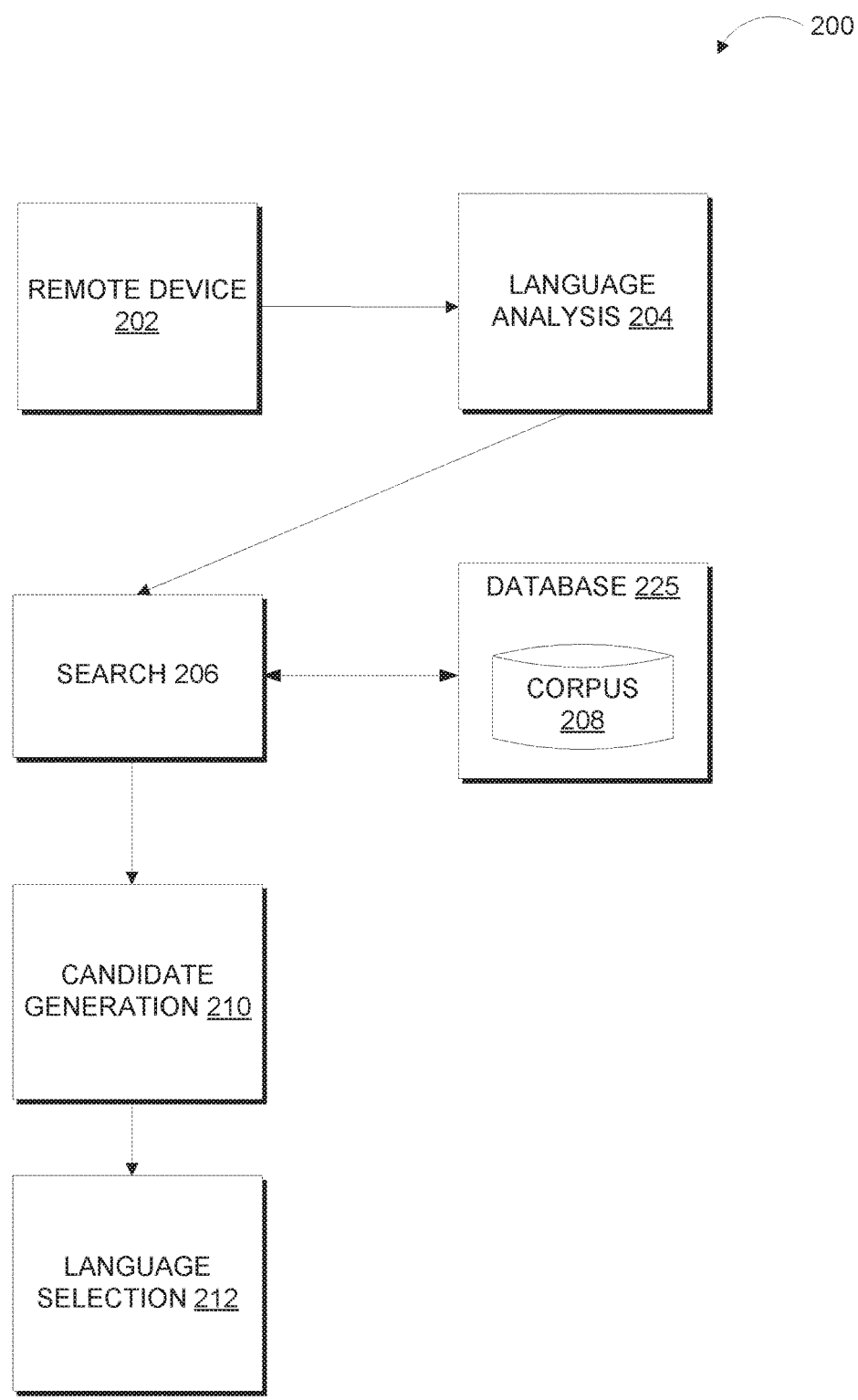
FIG. 2 is a system diagram depicting a high level logical architecture for a language recognition system, according to embodiments.

FIG. 2 is a system diagram depicting a high-level logical architecture 200 for the language recognition system 130, consistent with embodiments of the present disclosure. Aspects of FIG. 2 are directed toward components for use with language recognition system 130. In certain embodiments, the language analysis component 204 can receive a audio data from a remote device 202, and can analyze the audio data, using speech recognition and natural language processing. The search component 206 can formulate queries from the output of the language analysis component 204 and may consult various resources such as the internet or one or more knowledge resources, e.g., corpora 208 via database 225 to retrieve documents, passages, web-pages, database tuples, etc., that are relevant to determine one or more languages associated with the received auto data. For example, as shown in FIG. 2, in certain embodiments, the search component 206 can consult a corpus of information 208 on a database 225. The candidate generation component 210 can then extract from the search results potential (candidate) language matching the received data, which can then be scored and ranked by the language selection component 212 which may produce a final ranked list of languages with associated confidence measure values. The produced list may be generated for display on remote device 202. In various embodiments, language analysis component 204 may receive a language selection from remote device 202 indicating a confirmation of the use of a language from the generated list of language candidates.

The various components of the exemplary high level logical architecture for language recognition system described above may be used to implement various aspects of the present disclosure. For example, the language analysis component 204 could, in certain embodiments, be used to process a natural language question for which relevant images can be provided. Further, the search component 206 can, in certain embodiments, be used to perform a search of a corpus 208 for a set of images that are related to the input image to the language recognition system. The candidate generation component 210 can be used to identify a set of candidate images based on the results of the search component 206. Further, the language selection component 212 can, in certain embodiments, be used to determine and select a subset of the set of candidate images to provide in a display area of remote device 202 In certain embodiments, the determination of the subset of the candidate images can be based on a confidence value of the set of images and a designated display specification.

Figure 3:
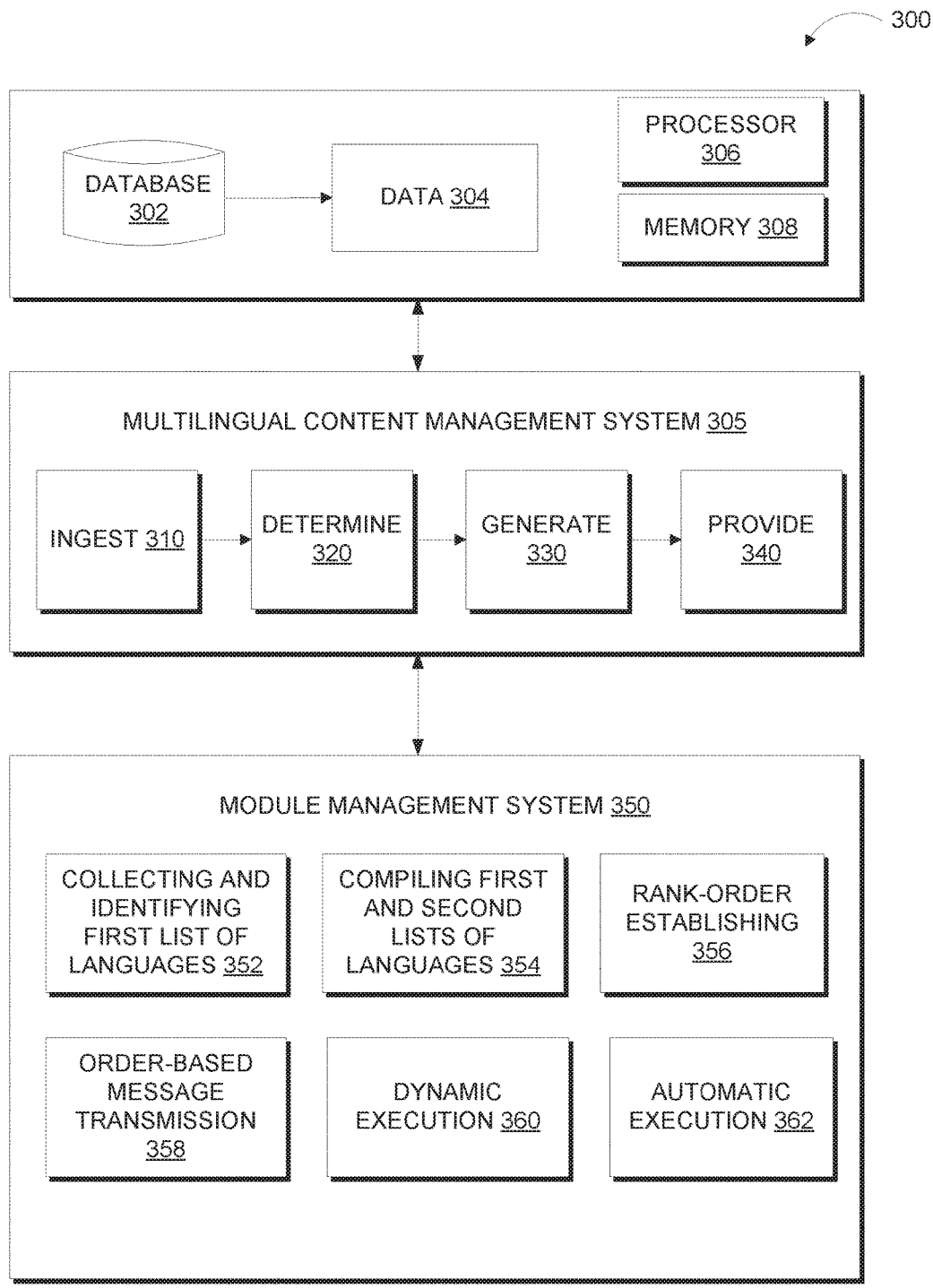
FIG. 3 is a block diagram illustrating a system for multilingual content management, according to embodiments.

FIG. 3 is a diagram illustrating an example system 300 for multilingual content management, according to embodiments. The example system 300 may include a processor 306 and a memory 308 to facilitate implementation of multilingual content management. The example system 300 may include a database 302 (e.g., multilingual content database). In embodiments, the example system 300 may include a multilingual content management system 305. The multilingual content management system 305 may be communicatively connected to the database 302, and be configured to receive data 304 related to multilingual content management (e.g., sets of language usage data). The multilingual content management system 305 may include an ingesting module 310 to ingest a set of language usage data for a set of languages, a determining module 320 to determine a language profile for a group of users, a generating module 330 to generate a multilingual message based on the language profile for the group of users, and a providing module 340 to provide the multilingual message to the group of users. The multilingual content management system 305 may be communicatively connected with a module management system 350 that includes one or more modules for implementing aspects of multilingual content management.

In embodiments, a first subset of language usage data for a first subset of users of the group of users may be collected, and a first list of languages associated with the first subset of users may be identified at module 352. The first subset of language usage data may be collected using a first mobile computing device of the set of mobile computing devices. Generally, collecting can include gathering, detecting, capturing, acquiring, sensing, receiving, importing, or otherwise ingesting the first subset of language usage data for the first subset of users of the group of users (e.g., portion or segment of the group of users). The first subset of language usage data may include a collection of information that describes, defines, or characterizes which languages are used (e.g., spoken, read, and/or written) by a first subset of users associated with the first mobile computing device. In embodiments, collecting the first subset of language usage data may include using a software application configured to run on the first mobile computing device to monitor the social network activity, reading, verbal communication, media consumption, and other aspects of language usage by a first subset of users with respect to the first mobile computing device. In embodiments, a first list of languages associated with the first subset of users may be identified by analyzing the first subset of language usage data for the first subset of users of the group of users. Generally, identifying can sensing, discovering, computing, recognizing, distinguishing, ascertaining, or otherwise determining the first list of languages associated with the first subset of users. The first list of languages may include a record, index, account, archive, directory, or log of the languages used by the first subset of users of the group of users. In embodiments, identifying the first list of languages may include examining the first subset of language usage data to detect one or more languages that are used by the first subset of users (e.g., for telephone communication, social media communication, media consumption, or the like), and maintaining the first list of detected languages on the first mobile computing device. As an example, in response to detecting that a first subset of users engaged in a telephone call in German, read a web article in French, and watched a movie in English, a first list of languages of French, German, and English may be identified and stored on the first mobile computing device. Other methods of collecting the first subset of language usage data and identifying the first list of languages are also possible.

In embodiments, a second subset of language usage data for a second subset of users of the group of users may be collected (e.g., gathered, detected, captured, acquired, sensed, received, imported, ingested), a second list of languages associated with the second subset of users may be identified (e.g., sensed, discovered, computed, recognized, distinguished, ascertained, determined), and the first and second list of languages may be compiled by the multilingual content management engine to ingest the set of language usage data for the set of languages at module 354. The second subset of language usage data may include a collection of information that describes, defines, or characterizes which languages are used (e.g., spoken, read, written) by a second subset of users (e.g., portion or segment of the group of users) associated with the second mobile computing device. In embodiments, collecting the second subset of language usage data may include using a software application configured to run on the second mobile computing device to monitor the social network activity, reading, verbal communication, media consumption, and other aspects of the language usage by the second subset of users of the second mobile computing device. In embodiments, a second list of languages associated with the second subset of users may be identified by analyzing the second subset of language usage data for the second subset of users of the group of users. The second list of languages may include a record, index, account, archive, directory, or log of the languages used by the second subset of users of the group of users. In embodiments, identifying the second list of languages may include examining the second subset of language usage data to detect one or more languages that are used by the second subset of users (e.g., for telephone communication, social media communication, media consumption, or the like), and maintaining the second list of detected languages on the second mobile computing device. As an example, in response to detecting that a second subset of users used Swedish on a social networking site, composed a text message in Danish, and participated in a video call in Finnish, a second list of languages of Swedish, Danish, and Finish may be identified and stored on the second mobile computing device.

In embodiments, the first and second lists of languages may be compiled by the multilingual content management engine to ingest the set of language usage data. Generally, compiling can include collecting, assembling, accumulating, gathering, or otherwise aggregating the first and second lists of languages to ingest the set of language usage data. In embodiments, compiling can include combining the first and second lists of languages to assemble a single list of languages associated with the users of the group of users. In embodiments, compiling may include surveying a plurality of mobile computing devices of the group of users to assemble a single list of languages known to the users of the group of users together with the relative level of usage of each language with respect to the other languages of the list. As an example, a single list of languages may be compiled that indicates that a language of Swedish is known by 18% of the group of users, Danish is known by 24% of the group of users, Spanish is known by 31% of the group of users, and English is known by 80% of the group of users. As described herein, the single list of languages may be utilized to facilitate generation of the multilingual message by the multilingual content management engine. Other methods of collecting the second subset of language usage data, identifying the second list of languages associated with the second subset of users, and compiling the first and second lists of languages to ingest the set of language usage data are also possible.

In embodiments, a first ranking may be assigned to a first language, a second ranking may be assigned to a second language, and a rank-order may be established for the set of languages based on the first and second rankings at module 356. Generally, assigning can include specifying, attaching, ascribing, appending, distributing, or otherwise designating the first ranking for the first language and the second ranking for the second language. The first and second rankings may include grades, levels, or ratings based on the relative degree of usage of the first language and the second language, respectively. For instance, the first and second rankings may indicate a hierarchical position of the first and second languages with respect to one or more other languages of the set of language. In embodiments, assigning may include evaluating the set of language usage data for the set of languages, and specifying ranks for the first and second languages based on the proportion of users of the group of users by which they are used. As an example, consider that a first language is associated with a usage level of 18% with respect to the group of users and that a second language is associated with a usage level of 29% with respect to the group of users. Accordingly, assigning may include designating a first ranking of "1st" with respect to the second language and a second ranking of "2nd" with respect to the first language. Other methods of assigning the first ranking to the first language and the second ranking to the second language are also possible.

In embodiments, a rank-order to indicate a usage-based hierarchy for the set of languages may be established. The rank-order may be established by the multilingual content management engine based on the first ranking for the first language of the set of languages and the second ranking for the second language of the set of languages. Generally, establishing can include formulating, creating, instantiating, producing, assembling, structuring, arranging, organizing, or otherwise generating the rank-order to indicate the usage-based hierarchy for the set of languages. The rank-order may include a grouping, classification, or organization for the set of treatment options that arranges the set of languages based on their relative usage (e.g., as indicated by the first and second ranking). In embodiments, establishing the rank-order may include aggregating a plurality of rankings for individual languages of the set of languages, and structuring the rank-order to indicate a usage-based hierarchy for the set of languages (e.g., where languages that are used more frequently or are known by a larger portion of the group of users may be ranked higher than languages that are used less frequently or are known by a smaller portion of the group of users). As an example, consider an example in which 15% of a group of users know Italian, 35 percent of the group of users know Portuguese, and 50% of the group of users know Spanish. Accordingly, as described herein, Spanish may be assigned a first ranking of "1st," Portuguese may be assigned a second ranking of "2nd," and Italian may be assigned a third ranking of "3rd." As such, establishing may include structuring the rank-order such that Spanish is ranked 1st, Portuguese is ranked 2nd, and Italian is ranked 3rd. Other methods of establishing the rank-order to indicate the usage-based hierarchy for the set of languages are also possible.

In embodiments, a first language message using a first language and a second language message using a second language may be generated, and the first language message and the second language message may be transmitted with respect to first and second temporal periods, respectively, at module 358. In embodiments, aspects of the disclosure relate to providing portions of the multilingual message in a sequence based on the relative usage of one or more languages of the set of languages (e.g., such that portions of the multilingual message that that are associated with languages used more frequently/known by more users may be prioritized). The first and second language messages may be generated by the multilingual content management engine based on the rank-order to indicate the usage-based hierarchy for the set of languages. Generally, generating can include formulating, creating, instantiating, producing, assembling, structuring, arranging, organizing, or otherwise establishing the first and second language messages using the first and second languages, respectively. The first and second language messages may include portions of the multilingual message that are structured in a particular language of the set of languages. As an example, in the event that the multilingual message relates to an announcement of concert start times for an orchestra, the first and second language messages may include notifications of the concert start times in the first and second respective languages. In embodiments, generating the first and second language messages may include selecting a subset of languages of the set of languages that achieve a ranking threshold (e.g., top 2 languages, top 4 languages) as indicated by the rank-order, and using a natural language processing technique (e.g., natural language generation algorithm) to compose the first and second language messages using the selected languages. As an example, consider that the rank-order indicates a usage-based hierarchy for a set of languages in which Japanese is ranked 1st, Korean is ranked 2nd, and English is ranked 3rd. Accordingly, generating may include creating a first language message in Japanese and a second language message in Korean as indicated by the rank-order. Other methods of generating the first and second language messages using the first and second languages are also possible.

In embodiments, the first language message and the second language message may be transmitted with respect to a first temporal period and a second temporal period, respectively, to provide the multilingual message to the group of users. Generally, transmitting can include sending, conveying, relaying, broadcasting, announcing, or otherwise communicating the first and second language messages with respect to the first and second temporal periods, respectively. The first and second temporal periods may include specific points in time (e.g., 4:15 PM, 8:00 AM), time durations (e.g., 5:06 PM-5:07 PM, 10:00 AM-10:02 AM), relative sequences (e.g., before transmission of a second language message, after transmission of a first language message), time frames, or the like. In embodiments, transmitting the first language message and the second language message may include using the multilingual content management engine to create a transmission schedule for the first and second language messages that designates particular time frames for transmission of particular messages. In certain embodiments, the multilingual content management engine may be configured to designate time frames for transmission of the first and second language messages based on the usage-based hierarchy indicated by the rank-order. For instance, in certain embodiments, temporal periods may be designated for language messages such that those messages associated with higher rankings in the rank-order (e.g., indicating relatively greater usage by the group of users) are transmitted in advance of those messages with lower rankings in the rank-order. As an example, with reference to the previous example in which a language of Japanese is ranked 1st, a language of Korean is ranked second, and a language of English is ranked third in the rank order, transmitting may include broadcasting a first language message in Japanese with respect to a first temporal period of 10:12 AM, a second language message in Korean with respect to a second temporal period of 10:14 AM (e.g., upon completion of transmission of the first language message), and broadcasting a third language message in English with respect to a third temporal period of 10:16 AM (e.g., upon completion of transmission of the second language message). In certain embodiments, transmitting may include prioritizing the frequency of transmission of one or more languages based on the rank-order (e.g., such that language messages associated with languages having greater usage among the group of users may be broadcast/transmit more frequently). Other methods of transmitting the first language message and the second language message with respect to the first temporal period and the second temporal period, respectively, are also possible.

In embodiments, the ingesting, the determining, the generating, the providing, and the other steps described herein may each be executed in a dynamic fashion at module 360. The steps described herein may be executed in a dynamic fashion to streamline multilingual content management. For instance, the ingesting, the determining, the generating, the providing, and the other steps described herein may occur in real-time, ongoing, or on-the-fly. As an example, one or more steps described herein may be performed on-the-fly (e.g., language profiles may be dynamically determined and multilingual messages may be generated and provided in real-time as sets of language usage data are ingested) in order to streamline (e.g., facilitate, promote, enhance) multilingual content management. Other methods of performing the steps described herein are also possible.

In embodiments, the ingesting, the determining, the generating, the providing, and the other steps described herein may each be executed in an automated fashion at module 362. The steps described herein may be executed in an automated fashion without user intervention. In embodiments, the ingesting, the determining, the generating, the providing, and the other steps described herein may be carried out by an internal multilingual content management module maintained in a persistent storage device of a local computing device (e.g., network node). In embodiments, the ingesting, the determining, the generating, the providing, and the other steps described herein may be carried out by an external multilingual content management module hosted by a remote computing device or server (e.g., server accessible via a subscription, usage-based, or other service model). In this way, aspects of multilingual content management may be performed using automated computing machinery without manual action. Other methods of performing the steps described herein are also possible.

Figure 4:
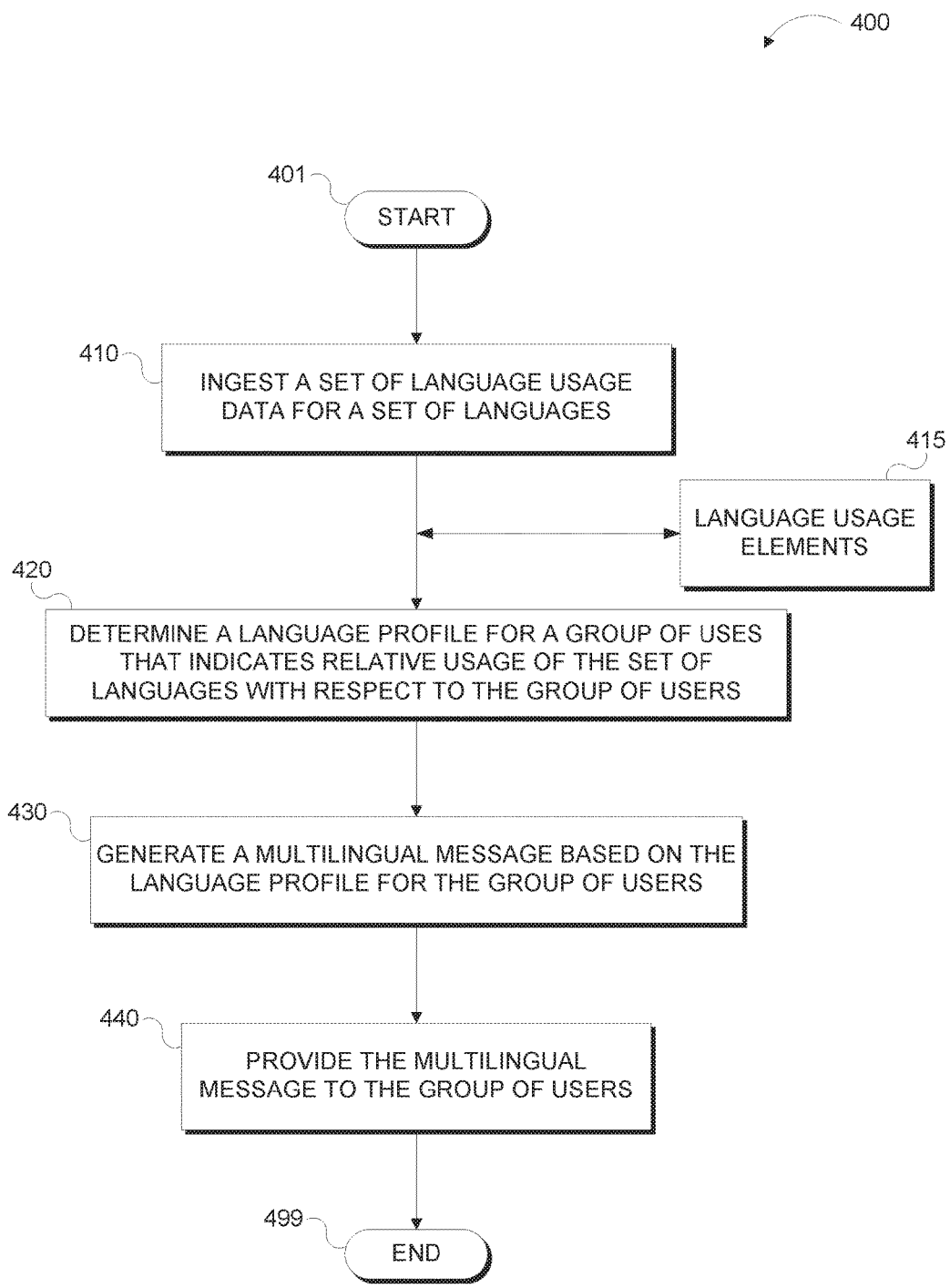
FIG. 4 is a flowchart illustrating a method for multilingual content management, according to embodiments.

FIG. 4 is a flowchart illustrating a method 400 for multilingual content management, according to embodiments. Aspects of the disclosure relate to the recognition that, in some situations, public announcements may be made without taking into account the languages used and spoken by the group of users to whom the announcement is made, limiting the usefulness and reliability of the communication. Accordingly, aspects of the method 400 relate to ingesting language usage data for a group of users (e.g., from mobile computing devices of the users) to determine a language profile that indicates the relative usage of a number of languages by the users of the group, and generating multilingual announcements for the group of users in accordance with the language profile. As such, the language profile for the group of users may be used to facilitate meaningful and efficient communication with respect to groups of people with diverse language backgrounds. In embodiments, aspects of multilingual content management may be performed by a multilingual content management engine. The multilingual content management engine may include a software module configured to ingest sets of language usage data, determine the language profile, generate and perform the multilingual message, and implement other aspects described herein. In embodiments, the multilingual content management engine may be integrated together with a public communication system infrastructure (e.g., airport/train station announcement system, stadium/concert venue guidance system, reception system) and be configured to interface with one or more mobile computing devices. Altogether, leveraging a language profile for a group of users with respect to data communication may be associated with benefits such as communication effectiveness, public announcement flexibility, and information exchange efficiency. The method 400 may begin at block 401.

At block 410, a set of language usage data for a set of languages may be ingested. The set of language usage data may be ingested from a set of mobile computing devices by a multilingual content management engine. Generally, ingesting can include gathering, capturing, acquiring, receiving, importing, or otherwise collecting the set of language usage data for the set of languages from the set of mobile computing devices. The set of languages may refer to natural languages used for human communication such as, for example, English, Japanese, Spanish, French, German, Mandarin, Hindi, and the like. The set of language usage data may include a collection of information that describes, defines, or characterizes which languages are used (e.g., spoken, read, written) by one or more users, and how they are used. The set of language usage data may indicate the degree/extent to which a group of users utilizes one or more languages (e.g., number of users in a group that use a particular language, frequency with which communication is performed using a language), the tasks/activities/situations in which he/she uses a particular language (e.g., articles are read in English but business-related communications are performed in Mandarin), the proficiency of the user with respect to a particular language (e.g., native proficiency, business-level, conversational), or the like. As described herein, the set of language usage data may be ingested from a set of mobile computing devices. As examples, the set of mobile computing devices may include smartphones, smart watches, tablets, laptop computers, wearable computers, or the like. In embodiments, ingesting the set of language usage data for the set of languages may include using the multilingual content management engine to transmit queries to mobile computing devices (e.g., within a proximity threshold to the multilingual content management engine) to request the set of language usage data. In certain embodiments, ingesting the set of language usage data may include receiving submissions indicating the set of language usage data for the set of languages from the set of mobile computing devices (e.g., in response to detection of the multilingual content management engine within a local network). Other methods of ingesting the set of language usage data are also possible.

In embodiments, a set of language usage elements may be monitored at block 415. The set of language elements may be monitored with respect to the set of mobile computing devices to ingest the set of language usage data for the set of languages. Generally, monitoring can include tracking, observing, recording, supervising, detecting, or otherwise auditing the set of language usage elements with respect to the set of mobile computing devices to ingest the set of language usage data for the set of languages. The set of language usage elements may include one or more properties, features, activities, or applications associated with usage of the set of languages. In embodiments, the set of language usage elements may include a social networking activity element. The social networking activity element may include an attribute that characterizes language use with respect to social networking platforms. For instance, the social networking activity element may indicate which languages are used to communicate to other individuals over social media, which languages are used to post/publicize content, or the like (e.g., comments to a subset of individuals are made in Korean, status updates posted in English). In embodiments, the set of language usage elements may include a textual content element. The textual content element may include an attribute that characterizes language use with respect to written information. As an example, the textual content element may indicate which languages are used to read articles, compose textual messages (e.g., emails, text messages), browse the internet, or the like (e.g., internet articles are read in Swedish). In embodiments, the set of language usage elements may include a communication activity element. The communication activity element may include an attribute that characterizes language usage with respect to communication with other individuals. For instance, the communication activity element may indicate which languages are used for verbal communication (e.g., phone calls, video messages) or non-verbal communication (e.g., composing messages, reading replies). In embodiments, the set of language usage elements may include a media content element. The media content element may include an attribute that characterizes language use with respect to multimedia content. As an example, the media content element may indicate which languages are used to watch movies, listen to music/podcasts, read books/newspapers, or the like (e.g., movies are watched in English, books are read in French). In embodiments, the set of language usage elements may include a sensor-derived data element. The sensor-derived data element may include an attribute that characterizes language usage as captured by a set of sensors (e.g., cameras, microphones, biometric sensors). For instance, the sensor-derived data element may indicate which sign languages or language-specific gestures are performed by a user (e.g., as captured by a camera of a mobile computing device). Other methods of monitoring the set of language usage elements to ingest the set of language usage data for the set of languages are also possible.

At block 420, a language profile may be determined for a group of users. The language profile may indicate relative usage of the set of languages with respect to the group of users. The language profile may be determined by the multilingual content management engine using the set of language usage data for the set of languages. Generally, determining can include computing, formulating, detecting, extracting, calculating, identifying, or otherwise ascertaining the language profile for the group of users by the multilingual content management engine using the set of language usage data for the set of languages. The language profile may include a collection of information or data that describes, defines, or characterizes which languages are used (e.g., spoken, read, and/or written) by a group of users. The language profile may indicate the proportion (e.g., ratio, percentage) of users in the group that use a particular language. As an example, the language profile may indicate that, with respect to a group of 100 users, 40 of the users know Mandarin, 30 of the users know English, 20 of the users know Hindi, 18 of the users know German, and 15 of the users know French (e.g., a plurality of users may know multiple languages). In embodiments, the language profile may be determined for the group of users by the multilingual content management engine using the set of language usage data for the set of languages. For instance, determining the language profile may include aggregating a set of language usage data from a plurality of mobile devices of the group of users, and evaluating the set of language usage data to ascertain the degree/extent of usage of one or more languages used by the users in the group. As an example, determining may include using the multilingual content management engine to evaluate the set of language usage data for the set of languages to ascertain a language profile that indicates that 15% of a group of users know Italian, 35 percent of the group of users know Portuguese, and 50% of the group of users know Spanish. Other methods of determining the language profile for the group of users by the multilingual content management engine using the set of language data for the set of languages are also possible.

At block 430, a multilingual message based on the language profile for the group of users may be generated. Generally, generating can include formulating, creating, instantiating, producing, assembling, structuring, arranging, organizing, or otherwise establishing the multilingual message based on the language profile for the group of users. The multilingual message may include an audio, video, or textual notification configured to communicate information to the group of users. For instance, the multilingual message may include an announcement, bulletin, warning, advertisement, publication, statement, interface, list, menu, or the like. In embodiments, the multilingual message may include content in one or more of a plurality of languages. As examples, the multilingual message may include an announcement of an airplane departure time that is repeated in Swahili, Yoruba, and Somali, an advertisement displayed in English, German, and French, or a restaurant menu presented in Cantonese and Mandarin. As described herein, the multilingual message may be generated based on the language profile for the group of users. Generating may include structuring the multilingual message in accordance with the relative usage of the languages indicated by the language profile for the group of users. For instance, generating may include identifying a subset of the set of languages that may be used to provide the multilingual message to a threshold portion of users of the group of users in a language that they know (e.g., 70% of the group, 90% of the group, 100% of the group). As an example, consider that a language profile for a group of users indicates that 50% of the group knows Russian (e.g., and no other language), 25% of the group knows both Spanish and English, 10% of the group knows Spanish and Portuguese (e.g., but not English), and 15% of the group knows Korean and English. Accordingly, generating the multilingual message may include structuring the multilingual message to include an announcement in Russian, Spanish, and Korean (e.g., such that 100% of the group receive the announcement in a language that they know). As another example, generating the multilingual message may include structuring the multilingual message to include the announcement in Russian, English, and Portuguese. In certain embodiments, in the event that multiple arrangements of the multilingual message are possible, the level of usage and level of proficiency of users in the group with respect to particular languages may be evaluated to determine an appropriate language combination/arrangement for the multilingual message. Other methods of generating the multilingual message are also possible.

At block 440, the multilingual message may be provided by the multilingual content management engine to the group of users. Generally, providing can include conveying, sending, relaying, supplying, transmitting, delivering, or otherwise presenting the multilingual message to the group of users. In embodiments, providing may include delivering the multilingual message to the group of users in one or more content formats (e.g., based on the nature of the multilingual message). As examples, providing may include broadcasting an audio-based announcement of the multilingual message, displaying a visual representation of the multilingual message (e.g., on a screen, in a graphical interface), posting a textual description of the content of the multilingual message, or the like. As an example, consider a multilingual message related to train arrival time information that is structured in Malay, Bengali, and Arabic. Accordingly, providing may include broadcasting a verbal announcement of the train arrival information that is repeated in Malay, Bengali, and Arabic, as well as displaying a visual representation of the train arrival information on screens in Malay, Bengali, and Arabic. In certain embodiments, providing the multilingual message may include defining a transmission order (e.g., sequence of delivery for portions of the multilingual message) for the multilingual message based on the relative usage of each language, and delivering the multilingual message in accordance with the transmission order (e.g., prioritizing portions of the multilingual message in languages associated with greater relative usage). Other methods of providing the multilingual message to the group of users are also possible.

Consider the following example. A set of mobile computing devices may monitor, track, and identify the languages known to the respective users of the set of mobile computing devices (e.g., based on the telephone communications, internet browsing languages, and media consumption) to assemble a set of language usage data for a set of languages. A multilingual content management engine may be integrated with the public announcement system at a mass-transit passenger terminal such as an airport passenger terminal. The multilingual content management engine may be configured to ingest the set of language usage data for the set of languages (e.g., using an Internet-of-Things communication environment) from the set of mobile computing devices, and generate a language profile for the group of users. For instance, the language profile may indicate that within the group of users, 30% of the group knows Japanese (e.g., and no other language), 20% of the group knows English (e.g., and no other language), 10% of the group knows both English and Japanese, 15% of the group knows Korean, 10% of the group knows Mandarin and English, 7.5% of the group knows Cantonese and Japanese, and 7.5% of the group knows Korean and Mandarin. Accordingly, a multilingual message may be generated by the multilingual content management engine based on the language profile. As an example, the multilingual content management engine may be structured to include an announcement in Japanese, English, and Korean (e.g., such that 100% of the group of users may receive the announcement in a language that they know). In embodiments, the multilingual content management engine may relay the multilingual message to the public announcement system, and the multilingual message may be provided to the group of users (e.g., passengers in the group of users) in Japanese, English, and Korean. Other methods of multilingual content management are also possible.

Method 400 concludes at block 499. As described herein, aspects of method 400 relate to multilingual content management. Aspects of method 400 may provide performance or efficiency benefits related to multilingual content management. As examples, generating and providing a multilingual message to a group of users based on a language profile may facilitate automatic determination of languages for communication, provision of appropriate language content in silent areas (e.g., libraries, embassies, immigration counters), multi-language content scaling (e.g., based on the relative usage of particular languages), or the like. Leveraging a language profile for a group of users with respect to data communication may be associated with benefits such as communication effectiveness, public announcement flexibility, and information exchange efficiency. Aspects may save resources such as bandwidth, processing, or memory.

Figure 5:
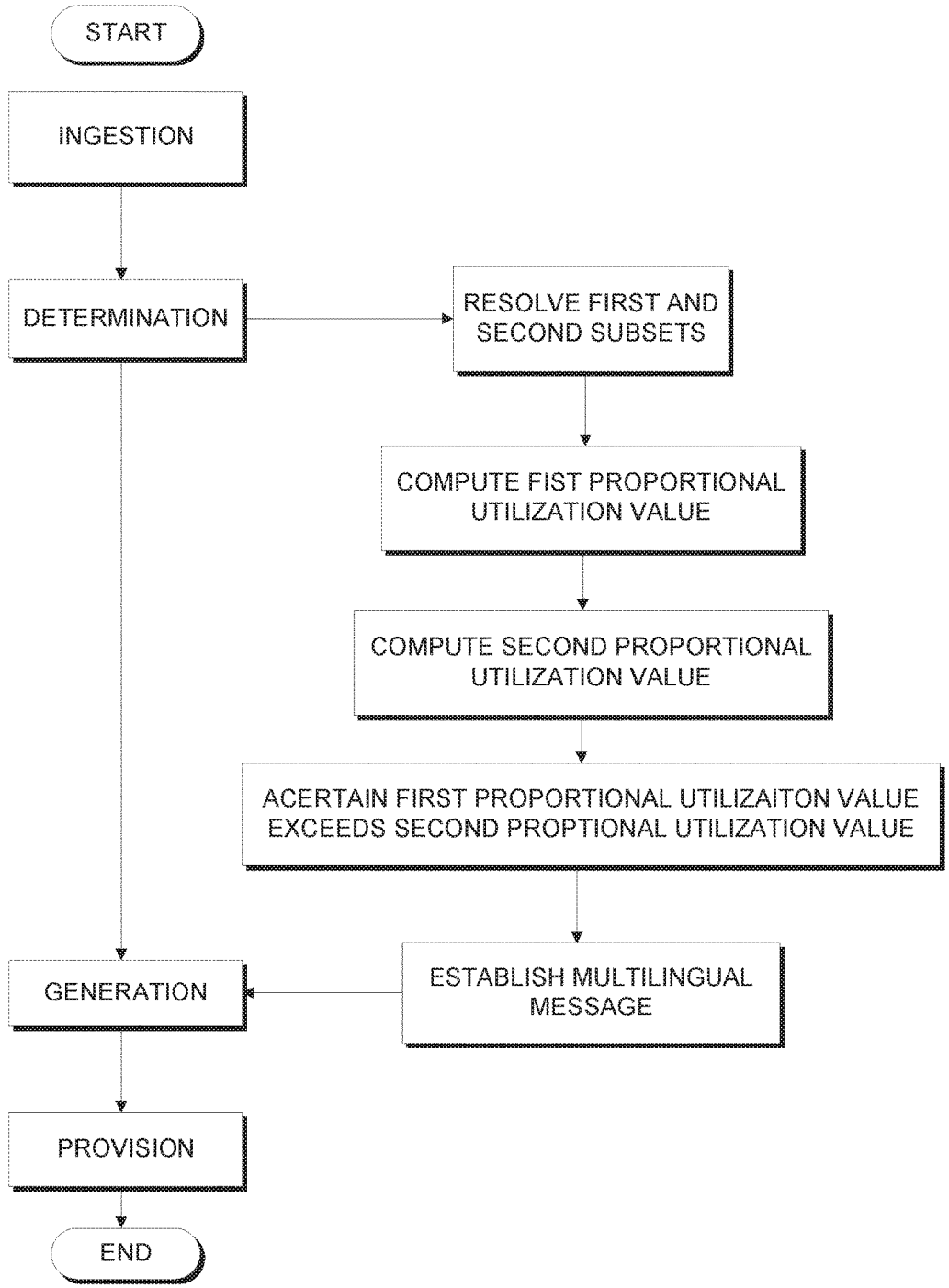
FIG. 5 is a flowchart illustrating a method for multilingual content management, according to embodiments.

FIG. 5 is a flowchart illustrating a method 500 for multilingual content management, according to embodiments. Aspects of method 500 relate to establishing the multilingual message based on proportional utilization values for a plurality of subsets of the set of languages with respect to the group of users. Aspects of method 500 may be similar or the same as aspects of method 400, and aspects may be utilized interchangeably. The method 500 may begin at block 501. At block 510, a set of language usage data for a set of languages may be ingested from a set of mobile computing devices by a multilingual content management engine. At block 520, a language profile for a group of users that indicates relative usage of the set of languages with respect to the group of users may be determined by the multilingual content management engine using the set of language data for the set of languages.

In embodiments, it may be determined that the set of languages includes a first subset of the set of languages and a second subset of the set of languages at block 521. The resolving may be used to determine the language profile for the group of users. Generally, resolving can include computing, formulating, detecting, extracting, calculating, identifying, ascertaining, or otherwise determining that the set of languages includes the first subset of the set of languages and the second subset of the set of languages. The first and second subsets of the set of languages may include groups of one or more languages associated with portions of the group of users. As an example, the first subset may include a group of languages of French and Italian, and the second subset may include a group of languages of English, Spanish, and German. In embodiments, the first and second subsets of the set of languages may include candidate combinations of languages for use in generating the multilingual message. In embodiments, resolving that the set of languages includes the first subset of the set of languages and the second subset of the set of languages may include utilizing a natural language processing technique to parse the set of language usage data ingested by the set of mobile computing devices, and identifying a set of language-specific elements (e.g., characters, symbols, punctuation that indicate a particular language) that indicate the first and second subsets of the set of languages. In certain embodiments, resolving may include evaluating the language profile for the group of users, and ascertaining the existence of a plurality of candidate language combinations that may be used to generate the multilingual message. Other methods of resolving that the set of languages include the first subset of the set of languages and the second subset of the set of languages are also possible.

In embodiments, a first proportional utilization value for the first subset of the set of languages that indicates a relative usage of the first subset of the set of languages with respect to the group of users may be computed at block 523. A second proportional utilization value for the second subset of the set of languages that indicates a relative usage of the second subset of the set of languages with respect to the group of users may be computed at block 525. The first and second proportional utilization values may be computed by the multilingual content management engine using the set of languages usage data. The first and second proportional utilization values may include quantitative indications of the relative degree/extent of usage of the first and second subsets of the set of languages, respectively. For instance, the first and second proportional utilization values may indicate the percentage/ratio of users of the group of users that use one or more languages of the first or second subsets of the set of languages. As an example, the first proportional utilization value may indicate that one or more languages of the first subset of the set of languages is known to 35% of the users of the group of users, and the second proportional utilization value may indicate the one or more languages of the second subset of the set of languages is known to 29% of the users of the group of users. In embodiments, computing the first and second proportional utilization values may include analyzing the set of language usage data ingested from the set of mobile computing devices to calculate the relative portion of the group of users that are associated with a language of either the first subset of the set of languages or the second subset of the set of languages. As an example, the multilingual content management engine may analyze the set of language usage data, and calculate a first proportional utilization value for the first subset of the set of languages of 56% and a second proportional utilization value for the second subset of the set of languages of 44% with respect to the group of users. Other methods of computing the first proportional utilization value for the first subset of the set of languages and a second proportional utilization value for the second subset of the set of languages by the multilingual content management engine using the set of language usage data are also possible.

In embodiments, it may be ascertained that the first proportional utilization value for the first subset of the set of languages exceeds the second proportional utilization value for the second subset of the set of languages at block 527. Generally, ascertaining can include computing, formulating, detecting, resolving, calculating, identifying, or otherwise determining that the first proportional utilization value for the first subset of the set of languages exceeds the second proportional utilization value for the second subset of the set of languages. In embodiments, ascertaining may include comparing (e.g., contrasting, juxtaposing, examining) the first proportional utilization value for the first subset of the set of languages with the second proportional utilization value for the second subset of the set of languages, and resolving that the magnitude of the first proportional utilization value exceeds (e.g., is greater than, surpasses) the magnitude of the second proportional utilization value. For instance, with reference to the previous example, the first proportional utilization value for the first subset of the set of languages of 56% may be compared with the second proportional utilization value for the second subset of the set of languages of 44%, and it may be ascertained that the first proportional utilization value exceeds the second proportional utilization value. In embodiments, ascertaining may include comparing the first and second proportional utilization values with respect to a designated proportion threshold that indicates a portion of the group of the users (e.g., 50%) that is desired to be covered by the multilingual message. Other methods of ascertaining that the first proportional utilization value for the first subset of the set of languages exceeds the second proportional utilization value for the second subset of the set of languages are also possible.

At block 529, the multilingual message may be established using the first subset of the set of languages. The multilingual message may be established by the multilingual content management engine in response to ascertaining that the first proportional utilization value for the first subset of the set of languages exceeds the second proportional utilization value for the second subset of the set of languages. Generally, establishing can include formulating, creating, instantiating, producing, assembling, structuring, arranging, organizing, or otherwise generating the multilingual message using the first subset of the set of languages. In embodiments, establishing may include structuring the multilingual message using the languages included in the first subset of the set of languages. As an example, consider that the first subset of the set of languages includes languages of Urdu, Vietnamese, and Tamil. Accordingly, in response to determining that the first proportional utilization value for the first subset of the set of languages exceeds the second proportional utilize value for the second subset of the set of languages, a multilingual message may be arranged to provide content (e.g., notifications, statements, announcements) to the group of users in Urdu, Vietnamese, and Tamil. Other methods of establishing the multilingual message using the first subset of the set of languages are also possible.

At block 530, the multilingual message based on the language profile for the group of users may be generated by the multilingual content management engine. At block 540, the multilingual message may be provided to the group of users by the multilingual content management engine. Method 500 concludes at block 599. As described herein, aspects of method 500 relate to multilingual content management. Aspects of method 500 may provide performance or efficiency benefits related to multilingual content management. Altogether, leveraging a language profile for a group of users with respect to data communication may be associated with benefits such as communication effectiveness, public announcement flexibility, and information exchange efficiency. Aspects may save resources such as bandwidth, processing, or memory.

Referring to FIG. 2, in various embodiments, the language recognition system 200 may act generally to receive a natural language question from a remote device 202, and can analyze the question to produce, minimally, the semantic type of the expected answer. The search component 206 can formulate queries from the output of the language analysis component 204 and may consult various resources such as the internet or one or more knowledge resources, e.g., corpora 208 via database 225, to retrieve documents, passages, web-pages, database tuples, etc., that are relevant to answering the question. For example, as shown in FIG. 2, in certain embodiments, the search component 206 can consult a corpus of information 208 on a database 225. The candidate generation component 210 can then extract from the search results potential (candidate) answers to the question, which can then be scored and ranked by the answer selection component 212 which may produce a final ranked list of answers with associated confidence measure values. The generalized natural language query system is described below in FIG. 6.

Figure 6:
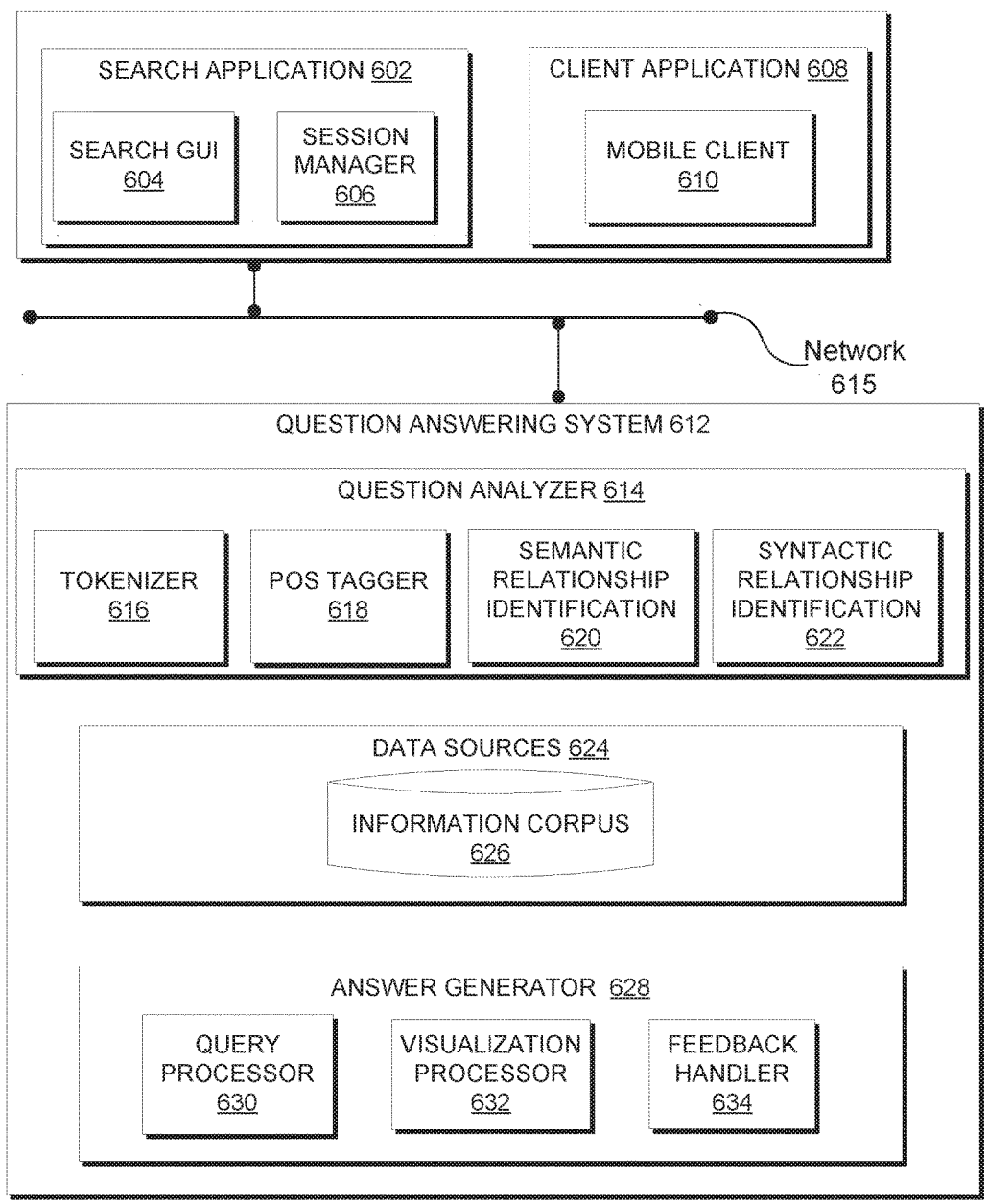
FIG. 6. is a block diagram illustrating a question answering system to generate answers to one or more input questions, according to embodiments.

FIG. 6 is a block diagram illustrating a question answering system (also referred to herein as a QA system) to generate answers to one or more input questions, consistent with various embodiments of the present disclosure. Aspects of FIG. 6 are directed toward an exemplary system architecture 600 of a question answering system 612 to generate answers to queries (e.g., input questions). In certain embodiments, one or more users may send requests for information to QA system 612 using a remote device (such as remote devices 102, 112 of FIG. 1). QA system 612 can perform methods and techniques for responding to the requests sent by one or more client applications 608. Client applications 608 may involve one or more entities operable to generate events dispatched to QA system 612 via network 615. In certain embodiments, the events received at QA system 612 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 608 can include one or more components such as a search application 602 and a mobile client 610. Client applications 608 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 612. For example, mobile client 610 may be an application installed on a mobile or other handheld device. In certain embodiments, mobile client 610 may dispatch query requests to QA system 612.

Consistent with various embodiments, search application 602 can dispatch requests for information to QA system 612. In certain embodiments, search application 602 can be a client application to QA system 612. In certain embodiments, search application 602 can send requests for answers to QA system 612. Search application 602 may be installed on a personal computer, a server or other computer system. In certain embodiments, search application 602 can include a search graphical user interface (GUI) 604 and session manager 606. Users may enter questions in search GUI 604. In certain embodiments, search GUI 604 may be a search box or other GUI component, the content of which represents a question to be submitted to QA system 612. Users may authenticate to QA system 612 via session manager 606. In certain embodiments, session manager 606 keeps track of user activity across sessions of interaction with the QA system 612. Session manager 606 may keep track of what questions are submitted within the lifecycle of a session of a user. For example, session manager 606 may retain a succession of questions posed by a user during a session. In certain embodiments, answers produced by QA system 612 in response to questions posed throughout the course of a user session may also be retained. Information for sessions managed by session manager 606 may be shared between computer systems and devices.

In certain embodiments, client applications 608 and QA system 612 can be communicatively coupled through network 615, e.g. the Internet, intranet, or other public or private computer network. In certain embodiments, QA system 612 and client applications 608 may communicate by using Hypertext Transfer Protocol (HTTP) or Representational State Transfer (REST) calls. In certain embodiments, QA system 612 may reside on a server node. Client applications 608 may establish server-client communication with QA system 612 or vice versa. In certain embodiments, the network 615 can be implemented within a cloud computing environment, or using one or more cloud computing services. Consistent with various embodiments, a cloud-computing environment can include a network-based, distributed data processing system that provides one or more cloud computing services.

Consistent with various embodiments, QA system 612 may respond to the requests for information sent by client applications 608, e.g., posed questions by users. QA system 612 can generate answers to the received questions. In certain embodiments, QA system 612 may include a question analyzer 614, data sources 624, and answer generator 628. Question analyzer 614 can be a computer module that analyzes the received questions. In certain embodiments, question analyzer 614 can perform various methods and techniques for analyzing the questions syntactically and semantically. In certain embodiments, question analyzer 614 can parse received questions. Question analyzer 614 may include various modules to perform analyses of received questions. For example, computer modules that question analyzer 614 may include, but are not limited to a tokenizer 616, part-of-speech (POS) tagger 618, semantic relationship identification 320, and syntactic relationship identification 622.

Consistent with various embodiments, tokenizer 616 may be a computer module that performs lexical analysis. Tokenizer 616 can convert a sequence of characters into a sequence of tokens. Tokens may be string of characters typed by a user and categorized as a meaningful symbol. Further, in certain embodiments, tokenizer 616 can identify word boundaries in an input question and break the question or any text into its component parts such as words, multi-word tokens, numbers, and punctuation marks. In certain embodiments, tokenizer 616 can receive a string of characters, identify the lexemes in the string, and categorize them into tokens.

Consistent with various embodiments, POS (part of speech) tagger 618 can be a computer module that marks up a word in a text to correspond to a particular part of speech. POS tagger 618 can read a question or other text in natural language and assign a part of speech to each word or other token. POS tagger 618 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 618 may assign include, but are not limited to, comparative or superlative adverbs, wh-adverbs, conjunctions, determiners, negative particles, possessive markers, prepositions, wh-pronouns, and the like. In certain embodiments, POS tagger 616 can tag or otherwise annotates tokens of a question with part of speech categories. In certain embodiments, POS tagger 616 can tag tokens or words of a question to be parsed by QA system 612.

Consistent with various embodiments, semantic relationship identification 620 may be a computer module that can identify semantic relationships of recognized entities in questions posed by users. In certain embodiments, semantic relationship identification 620 may determine functional dependencies between entities, the dimension associated to a member, and other semantic relationships.

Consistent with various embodiments, syntactic relationship identification 622 may be a computer module that can identify syntactic relationships in a question composed of tokens posed by users to QA system 612. Syntactic relationship identification 622 can determine the grammatical structure of sentences, for example, which groups of words are associated as "phrases" and which word is the subject or object of a verb. In certain embodiments, syntactic relationship identification 622 can conform to a formal grammar.

In certain embodiments, question analyzer 614 may be a computer module that can parse a received query and generate a corresponding data structure of the query. For example, in response to receiving a question at QA system 612, question analyzer 614 can output the parsed question as a data structure. In certain embodiments, the parsed question may be represented in the form of a parse tree or other graph structure. To generate the parsed question, question analyzer 614 may trigger computer modules 630-634. Question analyzer 614 can use functionality provided by computer modules 616-622 individually or in combination. Additionally, in certain embodiments, question analyzer 614 may use external computer systems for dedicated tasks that are part of the question parsing process.

Consistent with various embodiments, the output of question analyzer 614 can be used by QA system 612 to perform a search of one or more data sources 624 to retrieve information to answer a question posed by a user. In certain embodiments, data sources 624 may include data warehouses, information corpora, data models, and document repositories. In certain embodiments, the data source 624 can be an information corpus 626. The information corpus 626 can enable data storage and retrieval. In certain embodiments, the information corpus 626 may be a storage mechanism that houses a standardized, consistent, clean and integrated form of data. The data may be sourced from various operational systems. Data stored in the information corpus 626 may be structured in a way to specifically address reporting and analytic requirements. In one embodiment, the information corpus may be a relational database (e.g., conform to an ontology). In some example embodiments, data sources 624 may include one or more document repositories.

In certain embodiments, answer generator 628 may be a computer module that generates answers to posed questions. Examples of answers generated by answer generator 628 may include, but are not limited to, answers in the form of natural language sentences; reports, charts, or other analytic representation; raw data; web pages, and the like.

Consistent with various embodiments, answer generator 628 may include query processor 630, visualization processor 632 and feedback handler 634. When information in a data source 624 matching a parsed question is located, a technical query associated with the pattern can be executed by query processor 630. Based on retrieved data by a technical query executed by query processor 630, visualization processor 632 can render visualization of the retrieved data, where the visualization represents the answer. In certain embodiments, visualization processor 632 may render various analytics to represent the answer including, but not limited to, images, charts, tables, dashboards, maps, and the like. In certain embodiments, visualization processor 632 can present the answer to the user in understandable form.

In certain embodiments, feedback handler 634 can be a computer module that processes feedback from users on answers generated by answer generator 628. In certain embodiments, users may be engaged in dialog with the QA system 612 to evaluate the relevance of received answers. Answer generator 628 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 608 could be used to receive an input question having a set of query attributes. The question analyzer 614 could, in certain embodiments, be used to determine a language profile for a group of users that indicates relative usage of the set of languages with respect to the group of users. Further, the question answering system 612 could, in certain embodiments, be used to perform a search of an information corpus 626 for linguistic information that may be used to formulate a multilingual message for a group of users. The answer generator 628 can be used to generate the multilingual message based on the language profile for the group of users. Further, the visualization processor 632 can, in certain embodiments, be used to provide the multilingual message to the group of users (e.g., display a textual message in a visual display area).

Figure 7:
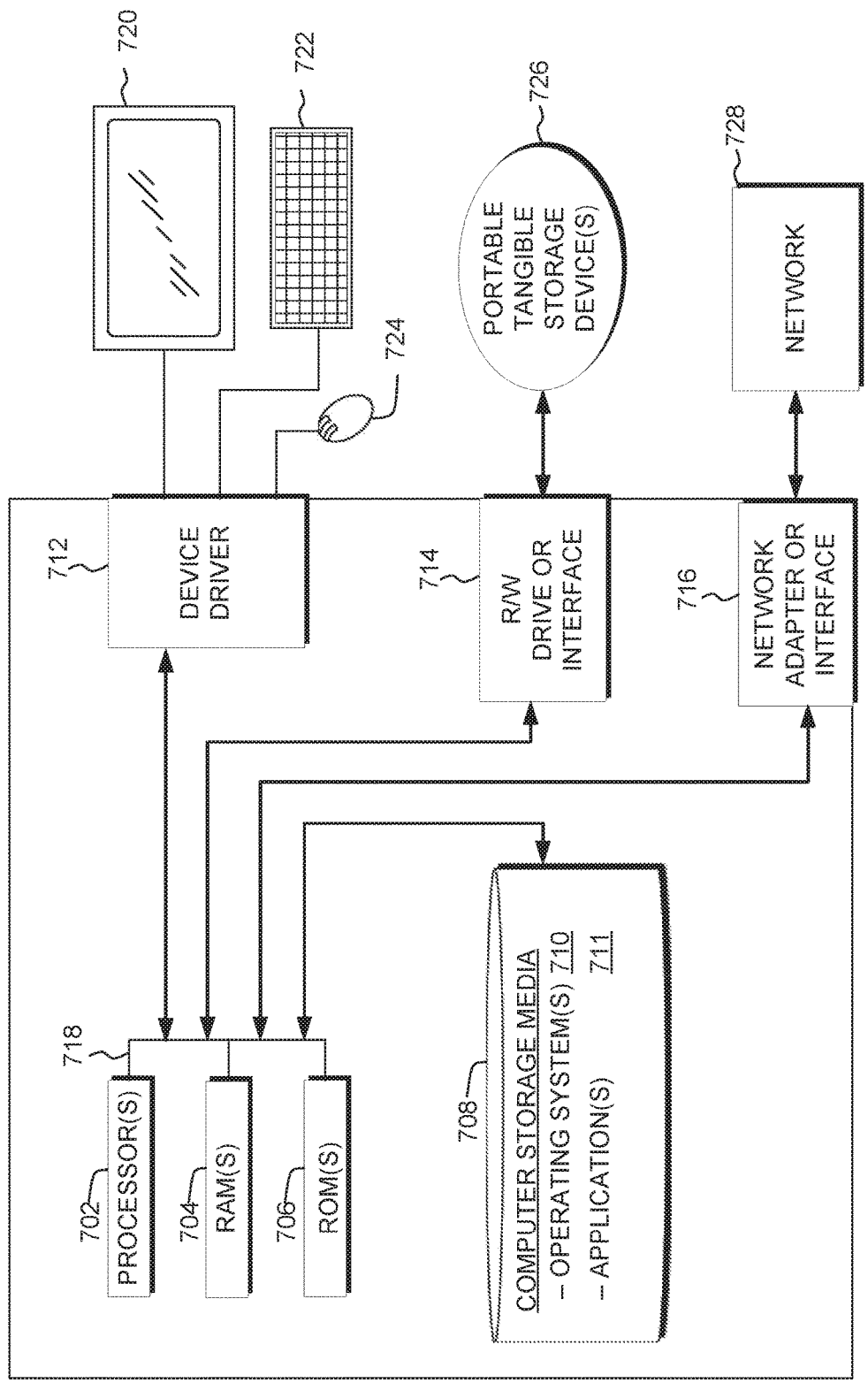
FIG. 7 is a block diagram of components of the server computer executing the language recognition system, in accordance with an embodiment of the present invention.

FIG. 7 depicts a block diagram of components of server 122 and remote devices 102 and 112 in FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Server 122 and remote devices 102 and 112 may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, language recognition system 130, are stored on one or more of the computer readable storage media 708 for execution by one or more of the processors 702 via one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 122 and remote devices 102 and 112 may also include a R/W drive or interface 714 to read from and write to one or more portable computer readable storage media 726. Application programs 711 on server 122 and remote devices 102 and 112 may be stored on one or more of the portable computer readable storage media 726, read via the respective R/W drive or interface 714 and loaded into the respective computer readable storage media 708.

Server 122 and remote devices 102 and 112 may also include a network adapter or interface 716, such as a TCP/IP adapter card or wireless communication adapter (such as a 4G wireless communication adapter using OFDMA technology) for connection to a network 717. Application programs 711 on server 122 and remote devices 102 and 112 may be downloaded to the computing device from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Server 122 and remote devices 102 and 112 may also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for multilingual content management, the method comprising:
   ingesting a data set comprising of one or more of audio, graphical, and textual data from a set of mobile computing devices by a multilingual content management engine, wherein the data set includes at least a set of language usage data for one or more languages;
   determining, by the multilingual content management engine, using the data set for a first language, a first language profile for a group of users that indicates relative usage of first language, with respect to the group of users;
   generating, by the multilingual content management engine, a multilingual message based on the first language profile for the group of users;
   transmitting, by the multilingual content management engine, the multilingual message to the group of users using data associated with the first language, wherein the transmitting of the multilingual message is based on the determined first language profile, increasing the efficiency of transmitting the multilingual message;
   resolving, to determine the language profile for the group of users, that a set of two or more languages, wherein the set of two or more languages includes a first subset of the set of languages, comprising at least the first language, and a second subset of the set of languages;
   computing, by the multilingual content management engine using the set of language usage data, a first proportional utilization value for the first subset of the set of languages that indicates relative usage of the first subset of the set of languages with respect to the group of users;
   computing, by the multilingual content management engine using the set of language usage data, a second proportional utilization value for the second subset of the set of languages that indicates relative usage of the second subset of languages with respect to the group of users;
   ascertaining, by the multilingual content management engine by comparing the first proportional utilization value for the first subset of the set of languages with the second proportional utilization value for the second subset of the set of languages, that the first proportional utilization value for the first subset of the set of languages exceeds the second proportional utilization value for the second subset of the set of languages;
   generating by the multilingual content management engine in response to ascertaining that the first proportional utilization value for the first subset of the set of languages exceeds the second proportional utilization value for the second subset of the set of languages, a majority multilingual message associated with the first subset of the set of languages, using the first subset of the set of languages, and a minority multilingual message associates with the second subset of the set of languages;
   transmitting the majority multilingual message to a first subset of the group of users associated with the first subset of the set of languages, wherein generating the majority multilingual message based on the first subset of the set of languages increases the efficiency of transmitting the majority multilingual message; and
   transmitting the minority multilingual message to a second subset of the group of users associated with the second subset of the set of languages, wherein generating the minority multilingual message based on the second subset of the set of languages increases the efficiency of transmitting the minority multilingual message.

* * * * *